UNITED STATES PATENT OFFICE.

HENRY SPENCER BLACKMORE, OF MOUNT VERNON, NEW YORK.

PROCESS OF MAKING ALKALI ALUMINATES.

SPECIFICATION forming part of Letters Patent No. 618,772, dated January 31, 1899.

Application filed July 22, 1896. Serial No. 600,097. (No specimens.)

*To all whom it may concern:*

Be it known that I, HENRY SPENCER BLACKMORE, a citizen of the United States, and a resident of the city of Mount Vernon, in the county of Westchester and State of New York, have invented a new and useful Improvement in Processes for Producing Alkali Aluminates from other Alkali Salts or Compounds and Formation of Original Combined Acid, of which the following is a specification.

The object of my invention is to transform alkali salts, particularly the natural products, such as common salt, (sodium chlorid,) into aluminates, together with the elimination or production of corresponding acid combined with such alkali compound operated on, as hydrochloric acid when a chlorid is employed or sulf-hydric acid if a sulfid is transformed, &c.

My invention relates particularly to a process for transforming natural alkali chlorids into alkali aluminates, with the elimination of hydrochloric acid, which distils and is absorbed or condensed, but is not confined to this, as any other alkali salts may be likewise transformed.

In carrying out my process on a practical basis I proceed as follows, taking, for example, the conversion of common salt (sodium chlorid) into sodium aluminate and hydrochloric acid: Sodium chlorid is heated in a closed carbon-lined vessel until it assumes a molten and obviously moving or free circulating condition, at which time aluminium hydroxid (hydrate) or alumina containing absorbed or occluded elements of water is gradually introduced into the moving circulatory mass, whereby a reaction takes place, hydrochloric acid being eliminated (which passes off in gaseous form and may be absorbed, condensed, or collected in any convenient manner, as desired) and sodium aluminate produced, which remains in a molten condition. When all the alkali chlorid has been converted into aluminate, it is withdrawn and treated in various ways to obtain salts desired, as by dissolving in solution of sulfuric acid, evaporating, and crystallizing soda alum is produced, or by dissolving in water and introducing carbonic anhydrid sodium carbonate is produced and aluminium hydroxid precipitated, which after thoroughly washing is in condition to be reused for the conversion or transformation of more salt, as before.

The sodium-carbonate solution produced during the precipitation of aluminium hydrated oxid may be readily converted into caustic soda (sodium hydroxid) by treatment with slaked lime (calcium hydroxid) in a manner well known to chemists, while the calcium carbonate produced by this step may be heated to redness, eliminating carbonic anhydrid, to precipitate more aluminium hydrated oxid, as before described, and the resulting quicklime slaked with water and utilized to produce more caustic soda from carbonate, as hereinbefore described.

When an alkali sulfid is transformed instead of chlorid by this process, an alkali aluminate is produced and sulf-hydric-acid gas eliminated instead of hydrochloric.

I am aware that processes have been devised to transform salts into free acid and form aluminates by mixing the salt with dry aluminium oxid and heating it to a high temperature, then passing ordinary steam over the same, whereby the aluminium oxid combined with the base of the salt, forming an aluminate and liberating the acid constituent, which is more or less dissociated by the high temperature employed, thus occasioning great loss. There are, however, many salts, such as sodium chlorid, which cannot be practically transformed in this way, owing to their extreme volatility at the temperature required, much thus being carried out of the apparatus by the current of liberated acid vapor, products of dissociation, and unconverted steam; also, by this process only superficial action takes place, as the steam only comes in contact with the surface of the mixture. There have also been devised processes whereby a current of steam is passed through molten alkali salt of volatile nature, whereby the volatilized salt is carried along with the current of steam into a heated receptacle containing aluminium oxid, and another which consists in mixing a salt, such as sodium nitrate (Chili niter) or sodium chlorid, with aluminium hydroxid and then heating the mixture in a proper receptacle. It is found practically, however, that before a temperature sufficient to admit of perfect transformation is attained much of the aluminium hydroxid has been dissociated, leaving aluminium oxid and liberating water in the form of steam; also, when the proper temperature is arrived at that the undissociated aluminium hydroxid remaining reacts almost immediately, liberating acid fumes, and thus causing the viscous mass to swell and foam, thereby becoming uncontrollable and requiring apparatus of large capacity to obtain small results, also occluding a large amount of acid and preventing its free liberation. In my process these difficulties are obviated, as the salt to be transformed is first melted. I then gradually introduce into the molten mass aluminium hydroxid or hydrated oxid, and before it can be dissociated into steam and aluminium oxid by the heat it dissolves and combines almost immediately with the molten mass in a quiet way, liberating acid vapors and forming aluminate. By this means I am enabled to keep the reaction under full control without loss by dissociation of either aluminium hydroxid employed or acid eliminated or volatilization of the salt operated on; also, by introducing the aluminium hydroxid into the molten mass I perform reaction within the mass and not superficially, as is the case when free steam is employed, and, finally, I can carry out my process in a continuous manner by supplying molten salt to the apparatus, introducing aluminium hydroxid until converted into aluminate, withdrawing molten aluminate produced, and automatically supplying fresh molten salt and aluminium hydroxid at intervals, as before, while if aluminium hydroxid were all mixed with the mass before heating it would not assume a free-flowing molten condition.

It is obvious that when the alkali salt to be transformed is treated in a molten condition, as employed in my process, the salt is in a free circulating condition, which is continually bringing fresh portions of salt to the transforming action of the aluminium hydroxid or hydrated oxid introduced from time to time and allowing the liberated acid fumes to be readily and easily freed or eliminated from contamination of the mass, and thus assuring perfect contact and reaction or transformation.

Having now described my process, what I claim as new, and desire to secure by Letters Patent, is—

1. The process for transforming salts into aluminates and eliminating original combined acid which consists in melting the salt to be transformed and introducing into the molten mass aluminium hydroxid or aluminium oxid containing absorbed or occluded elements of water substantially as described.

2. The process for producing alkali aluminate which consists in introducing into a molten alkali salt aluminium hydroxid (hydrate) or aluminium hydrated oxid substantially as described.

3. The process for producing sodium aluminate which consists in introducing into molten sodium chlorid aluminium hydroxid (hydrate) or aluminium hydrated oxid substantially as described.

4. The process for producing sodium aluminate and hydrochloric acid which consists in melting sodium chlorid and introducing gradually into the same aluminium hydroxid or hydrated oxid and collecting the acid fumes eliminated substantially as described.

5. The process for producing alkali aluminates which consists in dissociating aluminium hydroxid or hydrated oxid, in a molten bath of salt or compound to be transformed by introducing the same at intervals, substantially as described.

6. The process for producing alkali aluminates which consists in exposing a molten alkali salt to the action of aluminium hydroxid or hydrated oxid introduced at intervals substantially as described.

7. The process for producing alkali aluminates which consists in gradually transforming a molten alkali salt by the introduction at intervals of aluminium hydroxid or hydrated oxid substantially as described.

8. The process for producing alkali aluminate which consists in adding aluminium hydroxid or hydrated oxid to molten or naturally moving or circulating body of alkali salt substantially as described.

9. The process for producing alkali aluminate which consists in subjecting a molten alkali salt to the action of circulating particles of aluminium hydroxid or hydrated oxid substantially as described.

In testimony that I claim the foregoing as my invention I have signed my name, in presence of two witnesses, this 8th day of July, 1896.

HENRY SPENCER BLACKMORE. [L. S.]

Witnesses:
ISAAC BLACKMORE,
CHARLES F. IRWIN.